United States Patent [19]

Cucchi

[11] Patent Number: 5,320,008
[45] Date of Patent: Jun. 14, 1994

[54] DOUBLE-PUSHER BAR FEEDER FOR MACHINE TOOLS

[75] Inventor: Giovanni Cucchi, Via Genova 4, 20060 Bussero (Milan), Italy

[73] Assignees: Giovanni Cucchi; C.S.R.L., Bussero, Italy

[21] Appl. No.: 27,245

[22] Filed: Mar. 2, 1993

[30] Foreign Application Priority Data

Mar. 3, 1992 [IT] Italy .......................... MI92A000472

[51] Int. Cl.⁵ ........................ B23B 13/04; B23B 13/03
[52] U.S. Cl. .................................... 82/126; 82/127; 414/18
[58] Field of Search ................. 82/124, 125, 126, 127; 414/18

[56] References Cited

U.S. PATENT DOCUMENTS

| | | | |
|---|---|---|---|
| 3,612,298 | 10/1971 | Azuma | 82/127 |
| 3,889,822 | 6/1975 | Ross | 414/18 |
| 3,955,687 | 5/1976 | Flisch | 82/126 |
| 4,407,176 | 10/1983 | Link | 82/127 |
| 4,700,593 | 10/1987 | Cucchi | 82/127 |
| 4,889,024 | 12/1989 | Geiser et al. | 82/127 |
| 4,914,993 | 4/1990 | Fabbri | 82/127 |
| 4,953,429 | 9/1990 | Arisaka et al. | 82/127 |
| 5,066,185 | 11/1991 | Cucchi | 414/18 |

FOREIGN PATENT DOCUMENTS

0370240 5/1990 European Pat. Off. .

Primary Examiner—William E. Terrell
Attorney, Agent, or Firm—Young & Thompson

[57] ABSTRACT

A bar feeder for a machine tool, comprising a first guide and first pushing member for feeding bars in alignment with a spindle of the machine. A second bar guide and a second pushing member are laterally arranged to the first pushing member. A drive slidably moves the pushing members in a feeding direction of the bars. The first pushing member and second pushing member conjointly with the second bar guide are reciprocally alignable with the first guide. A programmable control unit (PLC) sequentially actuates the pushing members in an aligned condition with the first guide to forward a bar and insert it in a spindle maintaining an inoperative condition of the machine, and to forward by steps the bar along the spindle at each working cycle of the machine.

9 Claims, 8 Drawing Sheets

DOUBLE-PUSHER BAR FEEDER FOR MACHINE TOOLS

TECHNICAL FIELD

The present invention relates to automatic bar feeding devices for machine tools, and more particularly to a bar feeder comprising guide means for guiding bars axially aligned to a spindle of the machine, as well as comprising first and second pushing members sequencely acting in a programmed manner in order to move a bar forwards along the spindle of the machine.

BACKGROUND OF THE INVENTION

Automatic bar feeders for mono-spindle and multi-spindle machine tools are generally known, comprising pushers which operate to insert and move each bar forwards by steps along a bar guide means axially aligned with a spindle of the machine tool. U.S. Pat. Nos. 3,612,298, 3,955,687, and 4,407,176 are some examples of devices for feeding elongated bars on mono-spindle and multi-spindle turning machines.

Nevertheless bar feeders having single or double pusher, of the known type, have considerable disadvantages which depend on their structure and on the functional organisation of the feeder itself. In particular the use of a single acting pushing member require feeding device of considerable length furtherly involving long time for returning the pushing member and to reintroduce a new bar in the spindle of the machine.

In order to reduce the longitudinal dimensions of the feeder, EP-A- 26370 suggests the use of a double pushing device in which first and second pushing members are provided on a same carriage slidable on a guide rod parallelly arranged to guide channel axially aligned to a guide tube. The first pushing member during forwards stroke of the carriage operate to partially introduce a bar into the guide tube, while entraining the second pushing member on the same bar, then the carriage with both pushing members is retracted to dispose their second pushing member in alignment with the bar to furtherly introduce the latter during a second active stroke of the entraining carriage to feed the bar into the spindle of a machine.

Although said feeding device allows to substantially reduce the length of the same feeder, nevertheless it require long time consuming for returning the carriage to the starting position to activate the second pushing member of the device; the time lost for returning the carriage with the second pushing member therefore reduces the productivity of the machine.

In order to reduce noise and to improve bar charging operations in mono-spindle machines, U.S. Pat. No. 5,066,185 suggest the use of a carriage axially aligned to the spindle of the machine, to act as first pushing member to partially forward bars in the same working machine; a second pushing member is provided to move the bars in the final portion of its forward stroke, nevertheless both the pushers and the means for guiding the bars are structured and driven to move a bar forwards by steps along the spindle, at each working cycle, while the machine tool is in operation. Consequently, when the first pusher has completed its forward stroke, after the bar has been partially machined, the machine tool has to be stopped, the first pusher has to be replaced by the second one with the machine at a standstill and subsequently actuated to move the remaining part of the bar forwards by steps once again after the machine has been again started to operate.

In bar feeders with double pusher of the known type, it is therefore necessary to stop the machine to replace the pushing members, with consequent waste of time and productivity; furthermore in machine tools operating at extremely high speeds, stopping may cause impact and damage to the spindle and to the working tools.

Therefore, the scope of the present invention is to provide an automatic bar feeding device for machine tools, having double pushing device of the kind mentioned above, suitable designed for avoiding the above mentioned disadvantages.

A further scope of present invention is to provide a double-pusher bar feeding device which substantially allows to reduce the loading time of the bars, and devisable for use in mono-spindle and multi-spindle working machines.

The above mentioned scopes are accomplished by means of an automatic bar feeder complying with the characteristic features of the main claim.

BRIEF DESCRIPTION OF THE DRAWINGS

The invention is to be described in greater detail hereinunder with reference to some embodiments relating to a bar feeder both for a single-spindle and multi-spindle machines respectively; in the drawings.

DETAILED DESCRIPTION OF THE INVENTION

With reference to FIGS. 1 to 7, we will describe a first embodiment of an automatic bar feeder according to the present invention, comprising a feeding unit for a single-spindle machine. In the various figures the feeder is denoted as a whole by reference 10 for feeding bars 11 to the spindle 12 of a machine tool. FIGS. 1 to 7 show moreover the parts of the feeder which are essential functionally and structurally, comprising a support structure 13 both for the guide means and pushers for feeding the bars.

Figure 1:
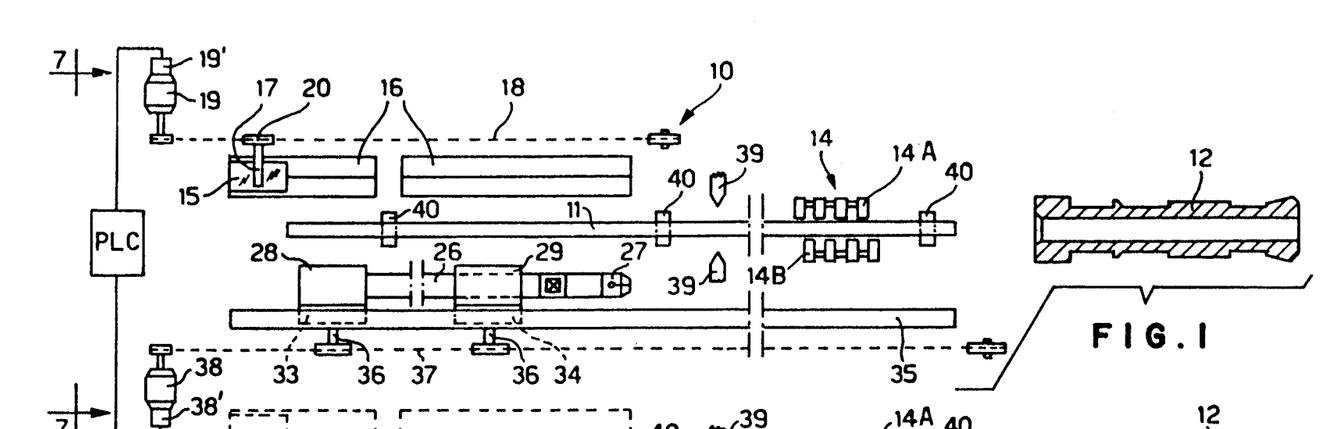
FIGS. 1 to 6 show schematically the structure and the functional organisation in the various work phases of a bar feeder for a single-spindle machine.
Figures 2, 3:
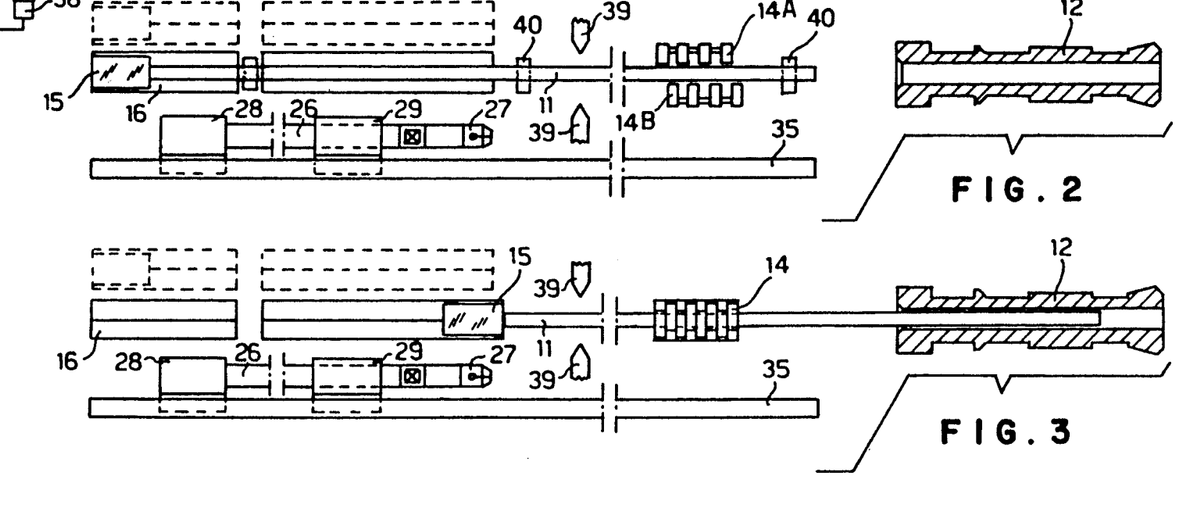

More particularly the feeder 10 comprises first guide means 14 for guiding the bars 11, axially aligned with the spindle 12, for example of the type comprising a plurality of opposed jaws 14A, 14B (FIG. 1) which, may be moved between an opened condition of FIG. 1, in which they allow the loading of a bar 11 and a closed condition respectively, as shown in FIG. 3, for guiding the bar 11 towards and along the spindle 12. The manner of operating of these jaws 14 is not described in detail since it is possible to use any suitable means for example such control or pneumatic control means connected to the rotational axis of each set of jaws 14A and 14B as show in FIGS. 16, 17.

The bar feeder moreover comprises a pushing member, more simply referred to as pusher 15, sliding along a channel member 16, having a "V-shaped" section, which forms guide means rearwardly provided to guide means 14 for guiding bars 11 for the purpose explained hereinunder. The pusher 15 is connected by an arm 17 to an endless chain 18 driven by a motor 19 controlled by a programmable logic control unit, or PLC, by control signals emitted by a signal generator or encoder 19' connected to drive motor 19. The arm 17 (FIG. 7) projects cantilevered from a runner 20 sliding in a guide channel 21 which together with a channel 22 contains the two branches of the endless chain 18. The assembly of the channel 16 for guiding the bars, the pusher 15, the chain 18 extend longitudinally and parallelly to the feeding direction of the bars 11; furthermore, said assembly, the drive motor 19 and channels 20 and 21, are tiltably supported by a frame 23 hinged in 24 parallel to the feed axis of the bars 11 to be moved or reciprocated laterally between a forward or advanced position, shown by an unbroken line in FIGS. 2 and 7, in which the guide channel 16 is in line with the guide 14 and the spindle 12 of the machine, and a backward or retracted position shown by the dotted lines in FIGS. 2 and 7 for the reasons explained hereinunder. The tiltable movement or reciprocation of the frame 23 with the guide 16, the pusher 15 and respective control means, can be achieved for example by means of a pneumatic cylinder 25 or another suitable actuator, controlled by the PLC.

Figure 7:
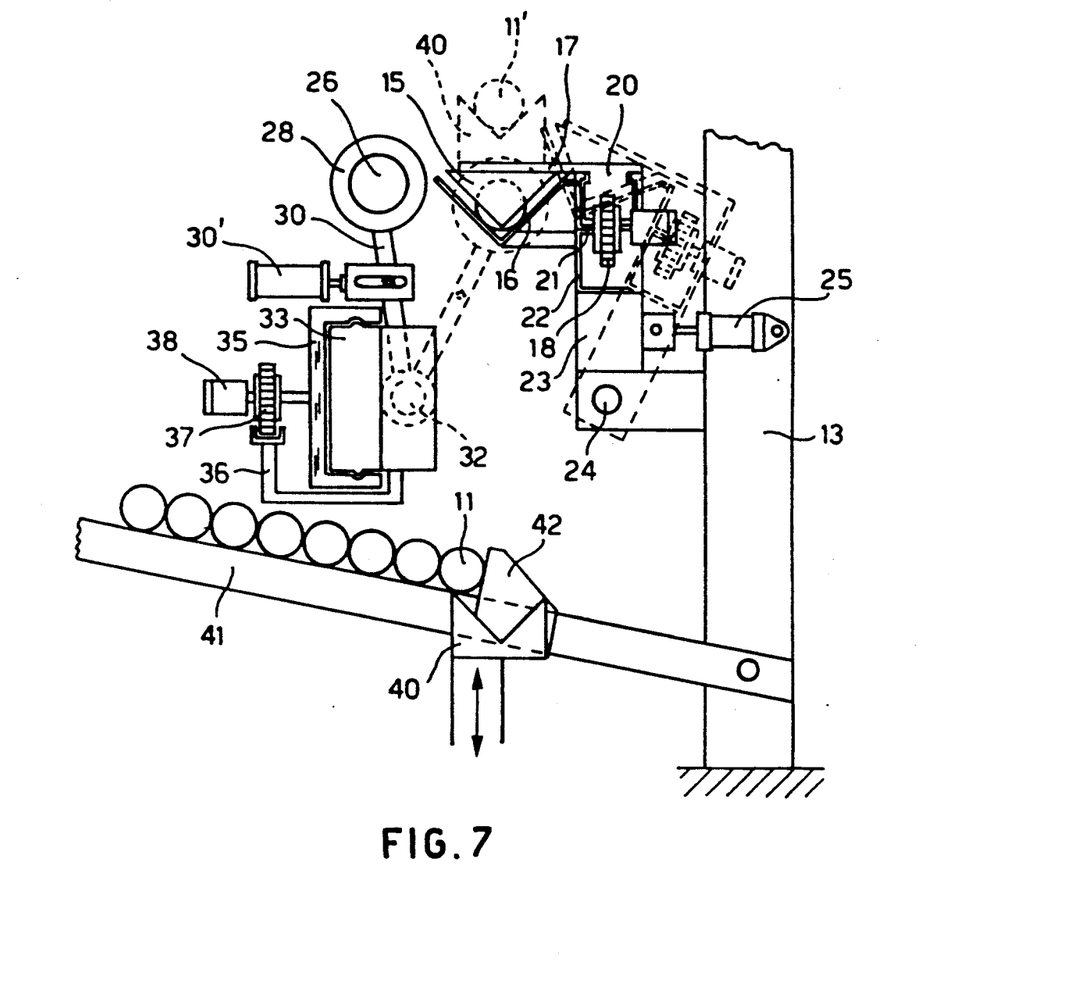
FIG. 7 is an enlarged view according to line 7—7 of FIG. 1.

The bar feeder according to this first embodiment is moreover provided with a second pusher 26 suitably guided and supported for operating in succession to the previous one, under the control of the PLC; the pusher 26 in turn moves or is reciprocable between a forward or advanced position shown by dotted lines in FIG. 7, in which it is in line with the guide 14 and the spindle 12 of the machine tool, and a backward or retracted position shown by an unbroken line in the same figure. More particularly this second pusher 26 comprises at its end a rotary collet 27 in which the rear end of the bar 11 is inserted. The second pusher 26 is slidably supported by means of a pair of sleeves 28 and 29, each of which is connected to a supporting arm 30, and 31 respectively, hinged to a slide or carriage 33 and 34 respectively, sliding in a guide 35 which extends longitudinally and parallelly to the feed axis of the bars 11, as shown.

Each carriage 33, 34 is connected by means of an arm 36, or another suitable means to an endless chain 37 driven by its own motor 38 having an encoder 38' for generating control signals for the PLC previously mentioned. As explained above, the pusher 26 and respectively the pusher 15 and channel 16 are connected to drive means to be reciprocated between a laterally retracted position and an advanced position axially aligned to the spindle of the machine.

The second pusher 26 is in the form of an elongated rod member having sufficient length for pushing the bar 11 completely forwards inside the spindle 12 passing through guide 14 in the open condition of its jaws. Moreover the pusher 22 is slidably supported by the front sleeve 29 so as to enable relative axial sliding movement at the end of the stroke.

Finally 39 in FIGS. 1 to 6 denotes a gripping members for gripping the bar, more commonly known as an extractor, which allow the insertion of the rear bar end into the collet 27 after the drawing or removal of the remaining bar section at the end of machining. Reference 40 in the various figures denotes moreover fork members moving vertically, forming part of a bar loader related to the same bar feeder. The loader may be constructed in any way and, as shown in FIG. 7, comprises a slanted plane 41 along which bars 11 to be fed slide down. The bars rest against a stop member 42 to be individually removed by the fork members 40 which raise it and load it into the guide channel 16.

The working of the feeder is briefly the following: it is assumed that the jaws 14A and 14B for guiding the bars are open (FIG. 1), and that the two pushers 15 and 26, with the relative drive means, are in the backward positions shown in the same figure. Moreover it is assumed that the forks 40 of the loader are fully lowered with the first bar 11 against the stop 42. Starting from this condition and under the control of the PLC, a bar 11 is first of all raised until it is brought into the position 11', above the pushers, in the position shown by the dotted lines in FIG. 7. After the bar 11 has been raised into the position 11', the PLC commands the forward movement of the guide channel 16 with the first pusher 15. This advanced position, with the guide channel 16 axially aligned to guide 14 and below the bar 11 previously raised, is shown in FIG. 2 and by an unbroken line in FIG. 7. After this position has been reached (FIG. 2), the jaws of guide 14 are closed, the forks 40 are lowered, and the first pusher 15 is actuated to slide the bar 11 forwards along the guide channel 16, the guide 14, and the spindle 12 until it stops the front end of the bar 11 at a collet for clamping bars (not shown) normally provided in the spindles of the machine tools.

In FIG. 3 it can be noted that in this condition, that is to say at the end of the forward stroke of the first pusher 15, the rear end of the bar 11 is placed slightly forwards in relation to the collet 27 of the second pusher 26 which is still in the retracted position on a side of feeding axis for bars. Moreover the extractor 39 is still open.

Figure 4:
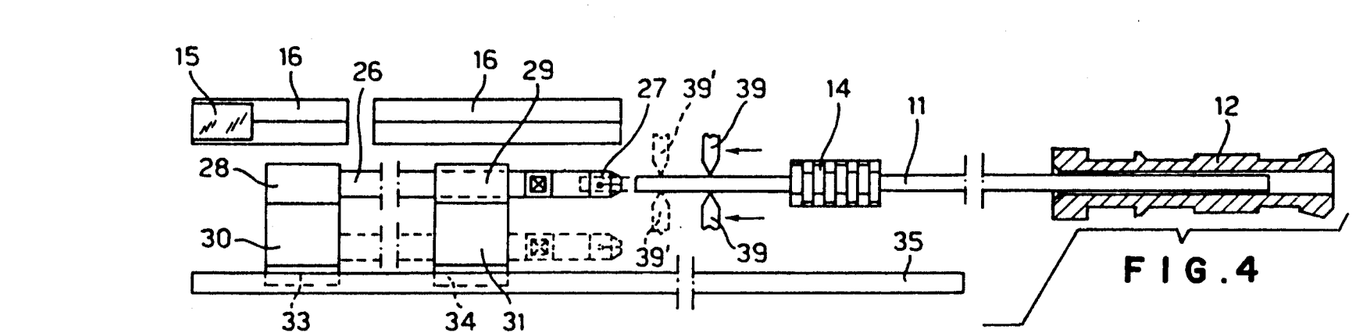
Figure 5:
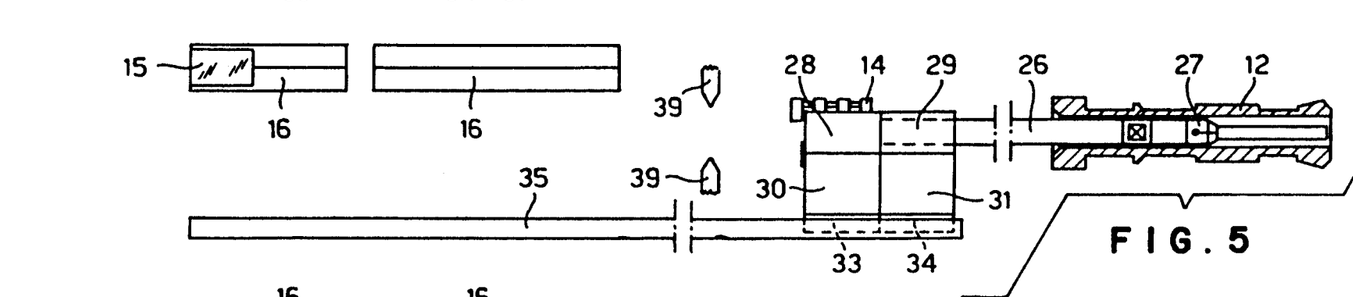

According to the work program stored in the programmable memory of the PLC, by means of the first pusher 15 the bar 11 is made to move forward in the guide 14 and in the spindle 12 until it is brought to stop at the proximity of the front end of the same spindle making it possible to regain substantially the entire length of the feeder and of the spindle with the machine at a standstill condition, without machining of the bar having started. The condition of FIG. 4 is then assumed in which it can be noted that the first pusher 15 with the channel 16 has once again been moved backwards, while the second pusher 26 has been moved forwards by the drive cylinder 30', until it is brought in line with the already positioned bar 11. Moreover the gripping element of the extractor 39 have been closed and moved backwards as denoted by 39' in order to insert the rear end of the bar into the collet 27. The extractor is then re-opened and from then on the forward step movement of the bar 11 is actuated by the second pusher 26 according to the program stored in the memory of the PLC, while the machine tool begins to work. When half of the bar 11 has been machined and when the carriage 34 has reached the end of its forward stroke, said carriage 34 is disengaged from the drive chain 37, or the bush 29 disengages from the pusher 26, while the forward step movement of the pusher is continued through open guide 14 by means of the rear carriage 33. When the rear carriage 33 has reached the end of its forward stroke, against the front carriage 34, as shown schematically in FIG. 5, the pusher 26 with the relative collet is fully inserted in the spindle 12, bringing the bar 11 to the end of machining.

Figure 6:
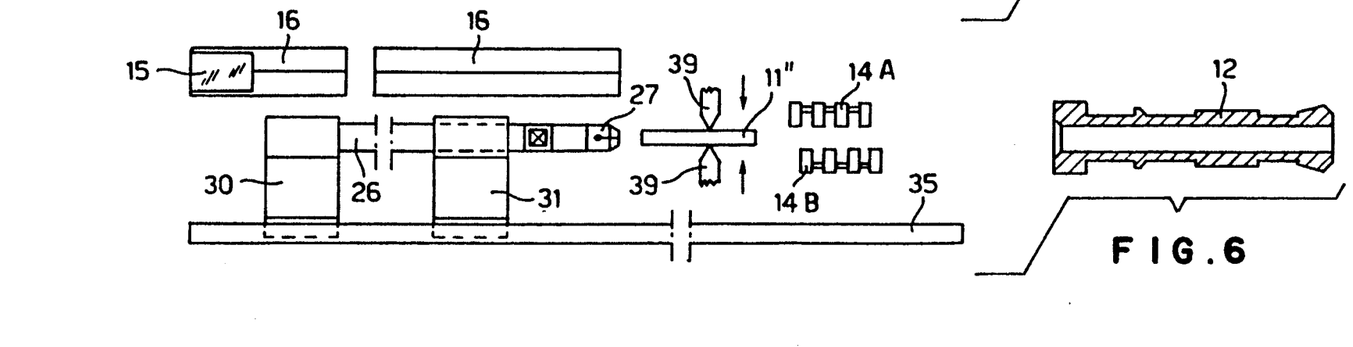

At this point the drive of the carriages 33, 34 is reversed, the pusher 26 is moved backwards withdrawing it from the spindle 12 with the remaining bar section, returning the whole to the start of the stroke as shown schematically in FIG. 6. In these conditions the extractor 39 is actuated to withdraw and unload the remaining bar section, then the second pusher 26 is again returned to the backward or lateral position. The conditions in FIG. 1 are restored so that it is possible to restart to load a new bar, for a new working cycle.

Referring now to FIGS. 8 to 14, we will describe a second embodiment of a bar feeder according to the invention, having several feed units on a rotating drum for a multi-spindle machine tool. As partially shown in FIGS. 13 and 14, the feeder substantially comprises a rotating drum 45 provided with a plurality of feeding units 46 for feeding bars 47, peripherally arranged on the drum 45 and axially aligned with the respective spindles 46' of the machine tool with which the drum 45 is driven to rotate synchronously. This drive part of the drum 45 of the feeding device according to the example in FIGS. 8-14 is not described here specifically, since it does not form a substantial part of the invention.

All the feeding units 46 of the drum 45 are identical and organised functionally in the same manner as illustrated in FIGS. 8 to 14 of the example in question. A bar 47 in each feeding unit 46, is guided towards a spindle 46' by guide means in the form of jaws 48 supported by the rotary drum 45 and actuated to open and close as shown.

In this case too, each feeding unit 46 comprises a first pusher 49 sliding along a guide 50 for the bars, consisting for example of a plurality of semi-circular jaws 51 (FIGS. 8 and 14) arranged side by side at a preset interval, so as to form a sort of guide channel having a semicircular section. The jaws 51 are attached by tie rods to a set of reciprocable plates 52, described hereinunder with reference to the enlarged view in FIG. 13.

Figure 13:
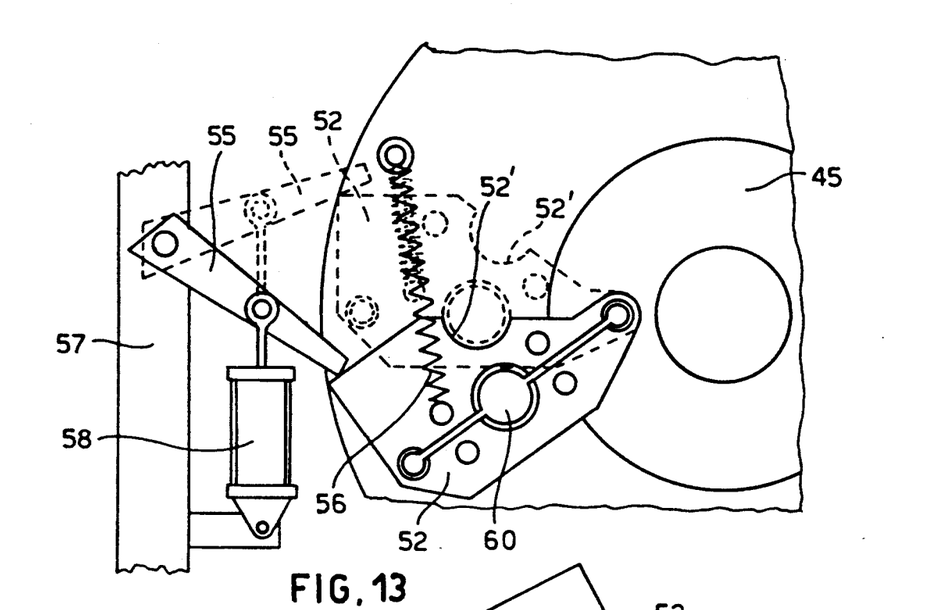
FIG. 13 is an enlarged cross sectional view along line 13—13 of FIG. 8.

The first pusher 49 is connected by means of a side arm to an endless chain 53 or another drive member actuated by a motor 54 provided with an encoder 54' which sends control signals to the logic control unit or PLC as previous case. The rockable plates 52 supporting both pushers, one of which is illustrated in FIG. 13, are appropriately shaped in order to have a semicircular slot 52' coaxial arranged to the semicircular jaws 51 for the sliding of a bar 47 and the passage of the pusher 49. The plates 52 are supported by the drum 45 so as to rotate angularly or be tilted around an axis arranged parallel to the axis of rotation of the same drum. The assembly of the plates 52 with the semicircular jaws 51 is normally moved to a position aligned with the guide jaws 48, for example by means of a return spring 56, while it can be lowered or moved backwards at the loading of a bar, by means of a drive device composed of a lever 55 hinged at the structure 57 of the feeder, actuated by a hydraulic or pneumatic cylinder 58 or another type of linear actuator.

Figure 14:
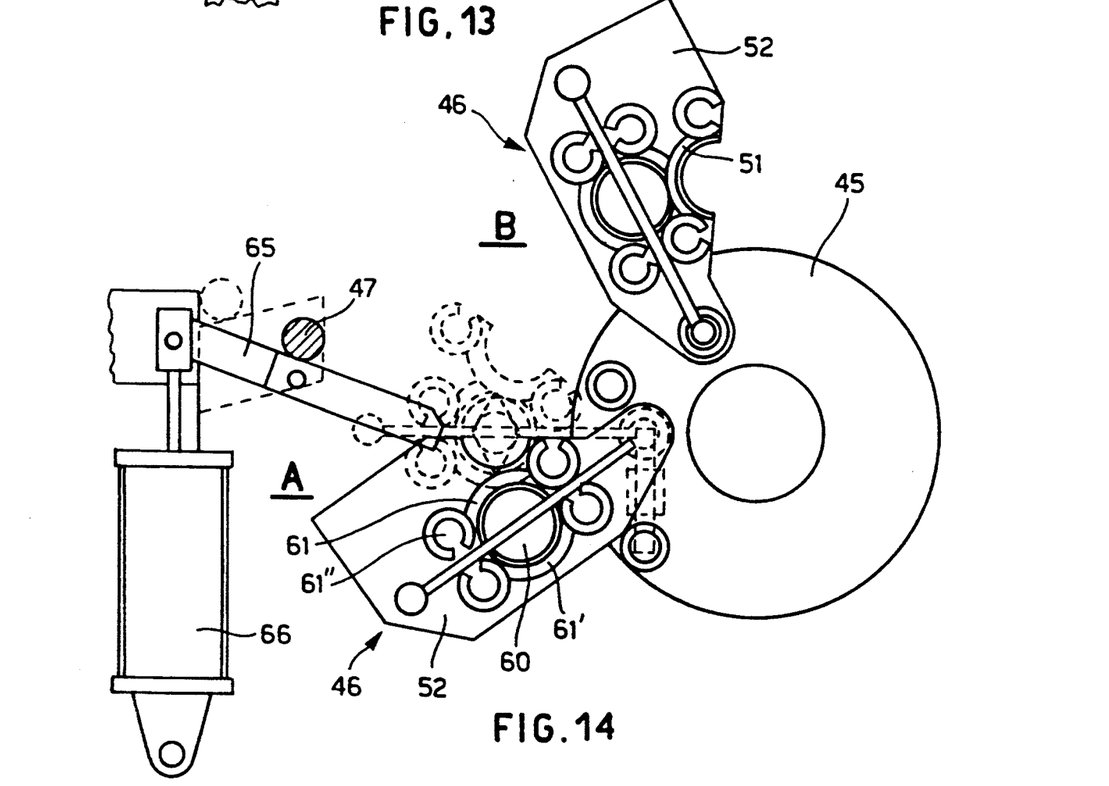
FIG. 14 is an enlarged cross sectional view along line 14—14 of FIG. 8.

In this case too the feeder comprises a second pusher, which can be moved conjunctly to the first one and positioned subsequent to the previous in alignment with the guide jaws 48. Unlike the previous case, wherein the two pushers are supported and moved wholly independently in order to align with the spindle of the machine tool, in this case both the pushers are supported conjunctly in predetermined angular positions by the same rocking plates 52. As shown in FIG. 14 and in the previous FIGS. 8 to 12, the second pusher comprises a collet 59 rotatably supported by a rod or tubular element 60 (shown in greater detail in FIG. 11) which, during a first initial portion of its stroke, is guided by the set of opposed and spaced apart semicircular jaws 61, 61' arranged on one side of the semicircular jaws 51 of the guide 50 for the first pusher. The opposed semicircular jaws 61 and 61' are attached to the plates 52 by connection rods 61''. The thrust rod 60, as will be explained hereinbelow, in its forward movement towards the spindle 46', is subsequently guided by the jaws 48.

The backward and forward movements of the second pusher are achieved by means of an endless chain drive 62 actuated by a motor 63 controlled by the PLC by means of the signals emitted by a signal generator or encoder 63'.

64 in the various figures moreover denotes the gripping members of an extractor, while 65 in FIG. 14 denotes as a whole an automatic loader actuated by a cylinder 66 controlled by the PLC to load each individual bar onto each unit 46 of the drum, when a feeding unit is in a predetermined angular position, during rotation of the drum.

We will briefly describe hereinunder the working of this second apparatus.

Figure 8:
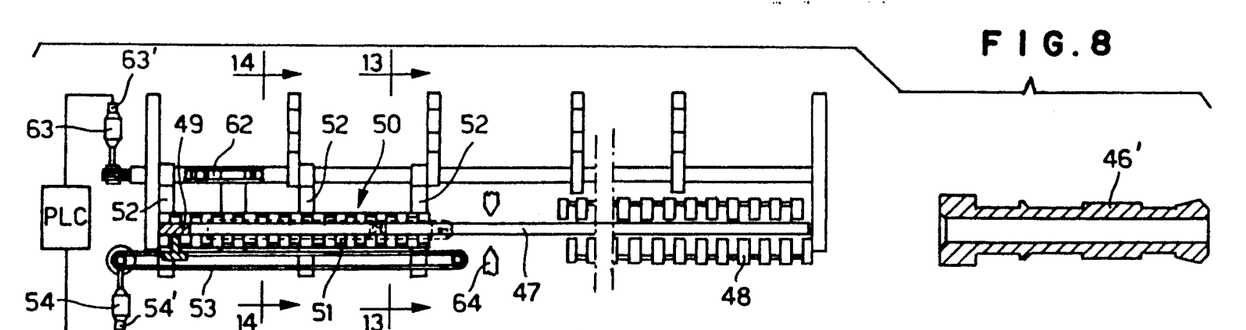
FIGS. 8 to 12 represent the basic working sequences for a multi-spindle bar feeder, shown only partially.

It is assumed that the drum 45 is at a standstill in the condition shown in FIG. 14 where, by way of an example, only two feeding units A and B have been shown, relating to the same number of spindles of a machine tool. As can be noted, the feeding unit A is represented by an unbroken line in the position in which the first pusher has been lowered by the cylinder 58 under the control of the PLC. In this position, as can be seen from FIG. 14, in accordance with FIG. 8, the semicircular jaws 51 which define the guide for bars are in a loading position suitable for receiving a bar 47 released on the tilted loader 65. The first pusher 49 is in a fully retracted position as shown in FIG. 8, the jaws 48 of the second guide are aligned with the spindle 46' and are shown open. As soon as a bar 47 has been loaded, the jaws 48 are closed and, again on a control signal of the PLC, actuates the motor 54 to move the pusher 49 in order to advance the bar 47 forwards into the corresponding spindle 46', until its front end is positioned at a collet (not shown) with which the spindle is normally provided. This forward movement of the bar 47 is controlled by the PLC fed by the pulses emitted by the encoder 54'. This phase of the bar moving caused by the first pusher, takes place with the spindle at a standstill and serves to regain the length of the feeder, as in the previous case.

Figure 9:
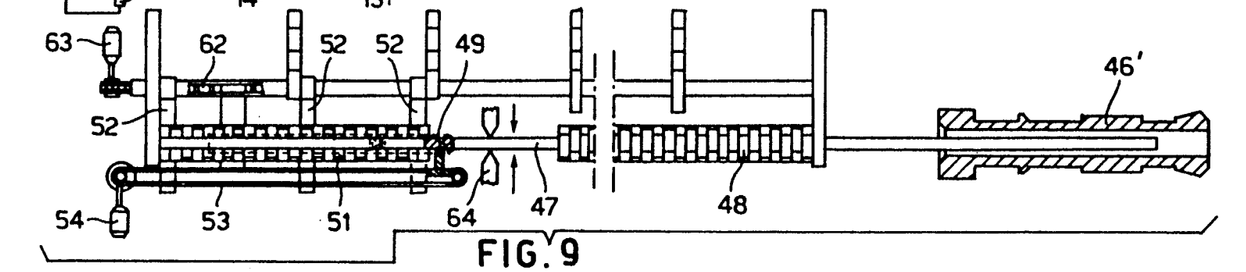
Figure 10:
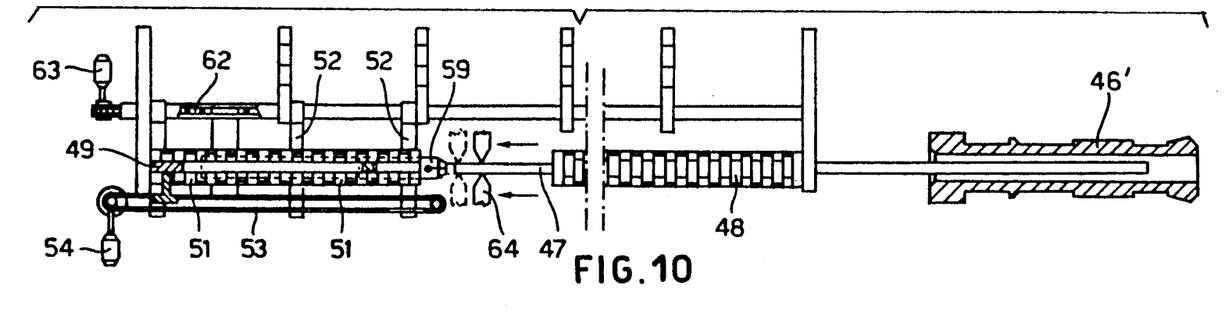

Once this phase of moving forwards has ended, and when the first pusher 49 has reached the end of its forward stroke, as shown in FIG. 9, and after the pusher 49 has been made to move backwards again to the rear end of the stroke, as shown in FIG. 10, the rear end of the bar 47 is slightly in an advanced position in relation to the collet 59 of the second pusher. At this point the cylinder 58 is once again actuated to raise the lever 55, releasing the plates 52 which, by means of the previously loaded spring 56, are advanced or made to rotate in a clockwise direction in FIGS. 13-14, bringing the entire feeding unit into the dotted position in which the second pusher 59, 60 is axially aligned to the bar 47 which has been already inserted in the spindle 46' of the machine tool. At this point, as shown in FIG. 10, the extractor 64 is actuated which then inserts the bar 47 into the collet 59. According to the program stored in the memory of the PLC, the motor 63 is now actuated which, again under the control of the logic unit and of the encoder 63', moves the bar 47 forwards until it projects by a predetermined portion from the spindle 46'.

This condition, schematically shown by a dotted line in FIG. 10, serves for the facing operation of the bar which is required before starting the working cycle.

Having faced the bar, the second pusher will be actuated to move the bar 47 forwards by steps for the entire working cycle of the machine, under the control of PLC by means of the signals emitted by the generator or encoder 63'. The bar will move forwards by steps until the pusher 59-60 has completed its forward stroke projecting fully inside the spindle as shown in FIG. 11.

Figure 11:
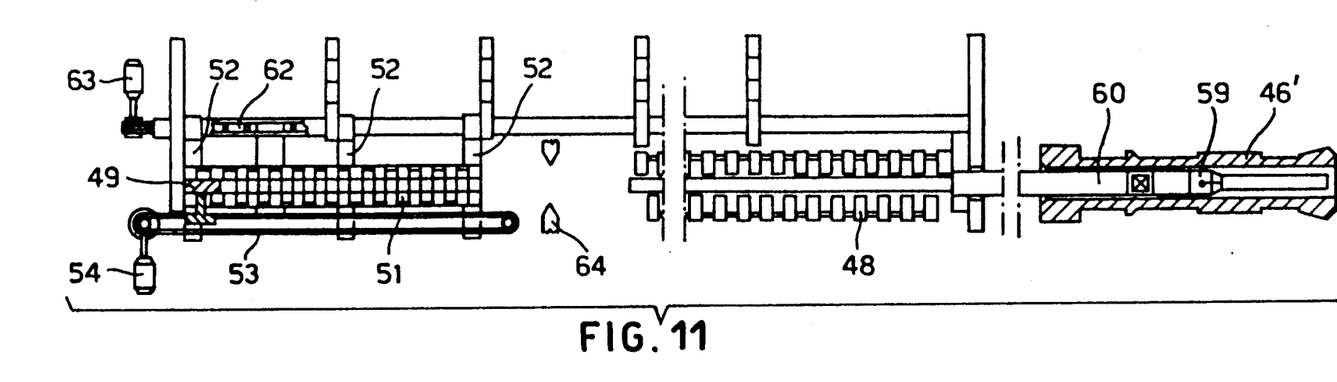
Figure 12:
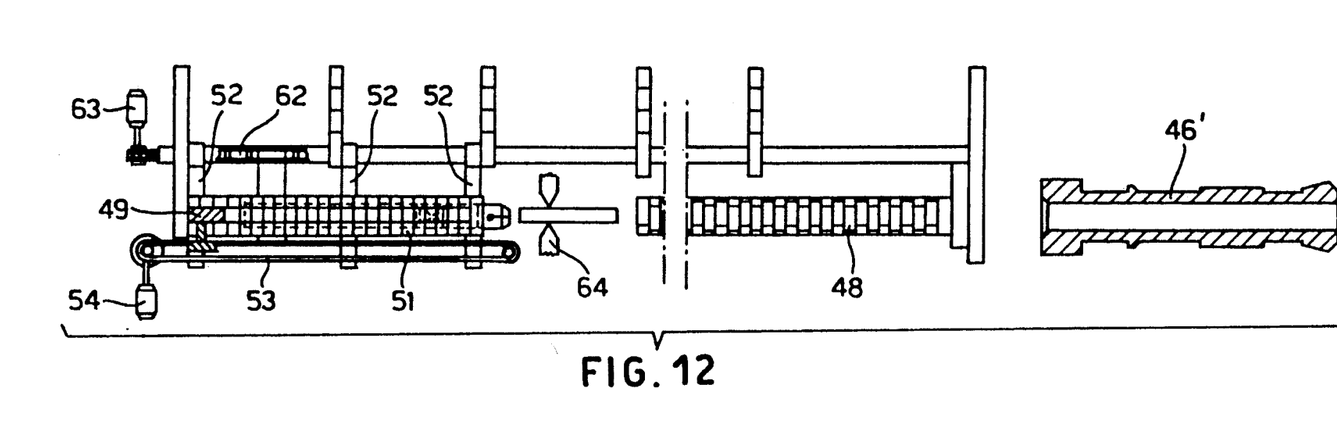

Having completed the forward movement of the bar, and achieved the condition in FIG. 11, the PLC will command the backward movement of the pusher 59-60 bringing it back into the condition of FIG. 12, after which the extractor 64 will be actuated once again to withdraw the section of bar remaining in the collet 59, thus preparing the whole in advance for a successive operation.

In the meantime the bar loading and feeding cycle has been started up and performed under the same procedures described previously for the other units 46 made to rotate by the rotary drum 45 of the feeder, synchronously with the rotation of the corresponding spindles of the machine tool.

Figure 15:
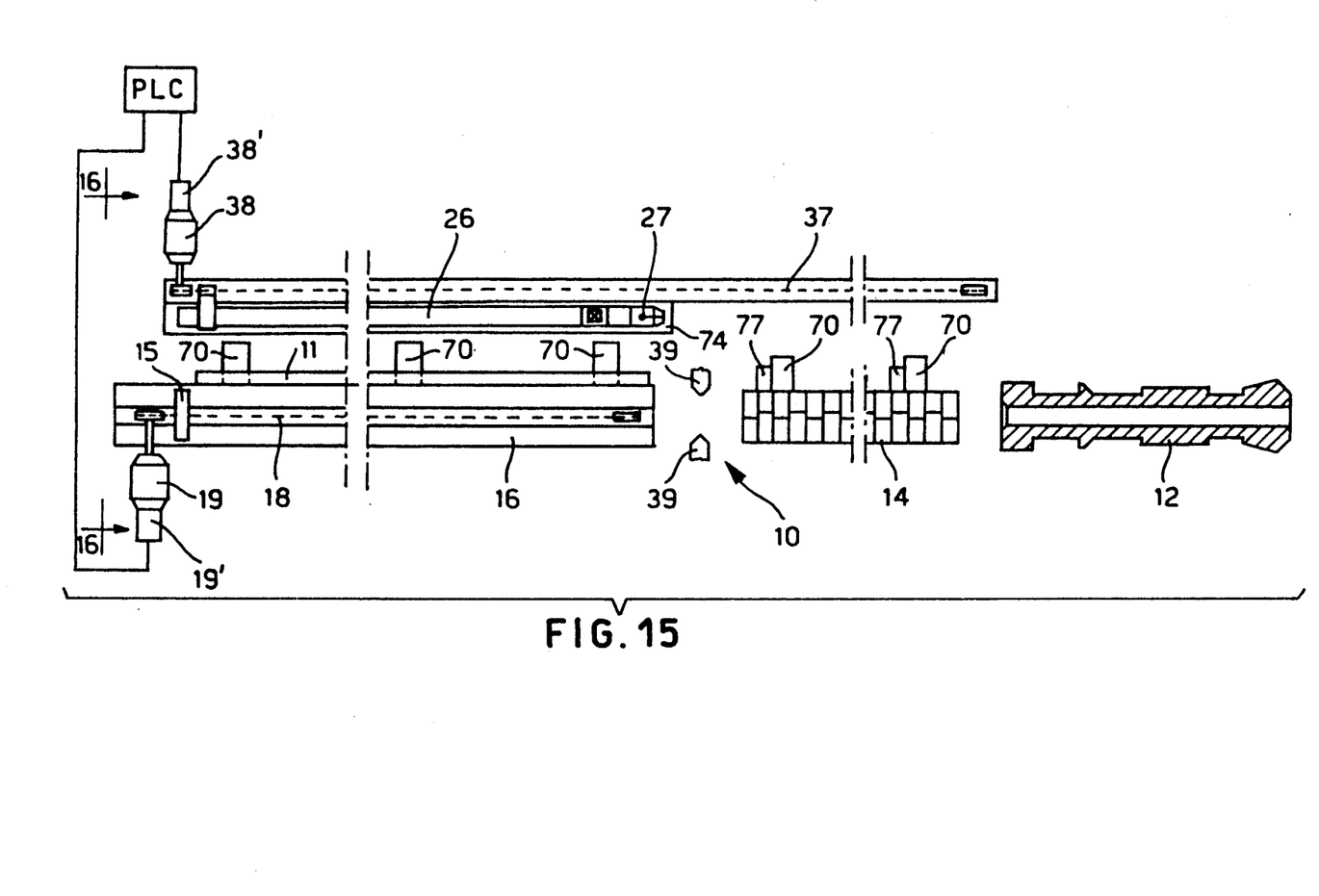
FIG. 15 is a schematic top view of a further embodiment of a feeder according to the invention.

A third embodiment of a bar feeding device, for a mono-spindle machine, will be now described with reference to FIGS. 15 to 17, using the same reference numbers for identical parts.

The feeder 10 comprises a frame 13, partially shown, supporting a first fixed guide 14 axially aligned with the spindle 12: the guide 14 consists again of a set of jaws 14A and 14B which may be opened and closed for example by raising and lowering the upper jaws by a cylinder 14C, to allow the insertion and feeding of a bar 11 in the spindle 12 of a machine tool.

The feeder moreover comprises a second movable guide 16 for loading bars, provided with a pusher 15 connected to the drive chain 18 actuated by the electric motor 19 which, by means of the encoder 19', is controlled by the logic unit or PLC as in previous cases.

Figure 16:
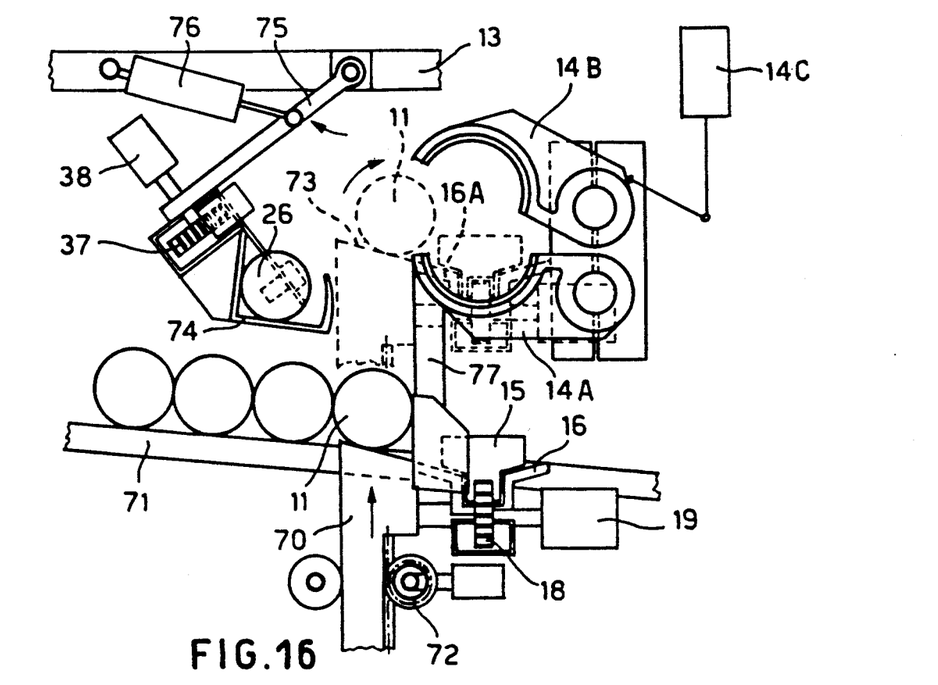
FIG. 16 is an enlarged cross sectional view taken along line 16—16 of FIG. 15, with the feeder in a first operating condition.
Figure 17:
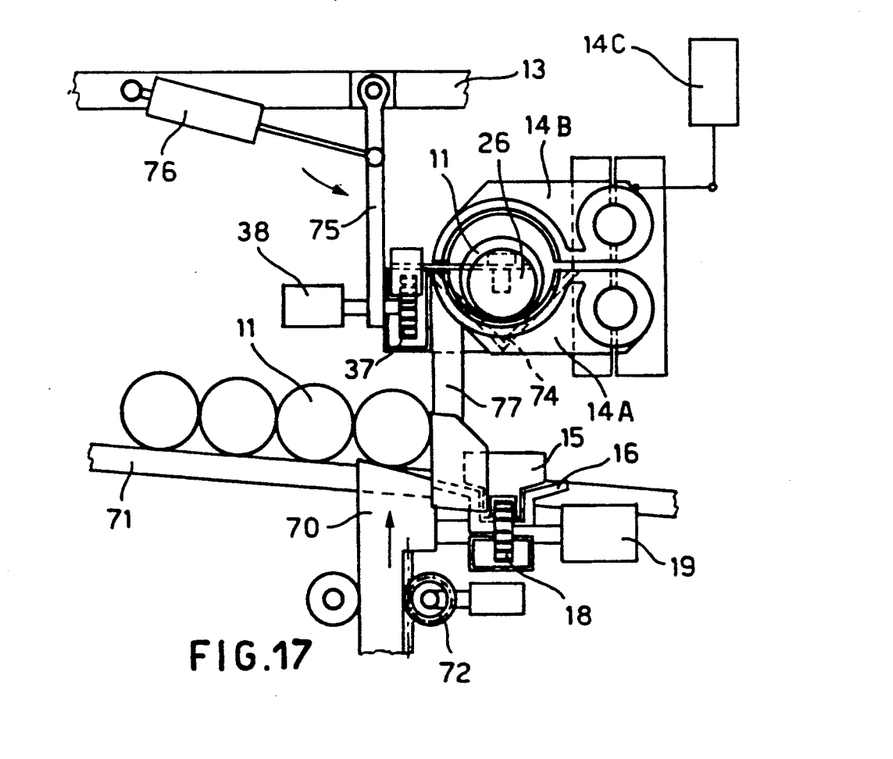
FIG. 17 is a sectional view similar to the one in FIG. 16, with the feeder in a second operating condition.

The guide 16 moves in a vertical plane between a lowered position, shown in FIG. 16, and a raised position, as outlined in the same figure, in which it receives a bar 11 from a store to place it in line with the fixed guide 14 for feeding towards the spindle 12 of the machine tool.

More specifically, as shown in FIG. 16, the mobile guide 16 for loading bars is in the form of a channel element, fixed laterally to rods 70 moving vertically to take up and transfer individual bars 11 from the loading device to the guide 14. The loader comprises rods 70 for removing individual bars, which are moved upwards and downwards by a rack drive 72. The rods 70 of the loader have a slanted upper surface 73 which continues in a corresponding slanted surface formed by a side wing 16a of the channel guide 16.

A pusher 15 slides along the guide 16 to move each bar 11 forwards along the fixed guide 14 and to insert it in the spindle 12 of the machine tool.

The pusher 15 is in the form of a blade and is connected to the chain 18 which runs on the bottom of the channel 16 and which is driven by a motor 19 provided with a signal emitter 19' connected to the PLC unit controlling the whole feeder.

The feeder moreover comprises a second pusher 26 sliding in a channel 74 supported by rocking arms 75. A cylinder 76 causes the rotation of the assembly of the pusher 26 and of its guide and respective drive means, between the retracted position of FIG. 16, in which said second pusher 26 is positioned far from the fixed guide 14 and the forward or advanced position of FIG. 17, in which the guide channel 74 and the pusher 26 are arranged in an aligned position with the fixed guide 14 replacing the guide 16 and the pusher 15 after the bar 11 has already been inserted.

As shown in the drawings, the second pusher 26 ends in a collet 27 in which the rear end of the bar 11 is inserted, after the same bar has been inserted in the guide 14. The pusher 26 is also driven to move forwards by a chain 37 actuated by a motor 38 provided with a signal generator 38' controlled by the PLC.

Briefly, the feeder functions as follows: initially the first pusher 15 with the relative guide 16 for transferring the bars is in the lowered position of FIG. 16, while the second pusher 26, with the respective guide and drive means, is in the lateral position indicated by the same drawing.

According to the work program of the machine, the rods 70 are driven to rise and to take a first bar 11 from the store 71, causing it to slide upwards along vertical stop uprights 77. While they are being raised, the rods 70 bring about the simultaneous rise of the channel guide 16, of the pusher 15 and of the respective drive means. When the slanted surface 73 at the upper end of the rods 70 has reached the edges of the lower jaws 14A of the fixed guide 14, the bar 11, rolling on said slanted surface, falls into the guide 16. The guide 16 with the pusher 15 are lowered slightly until they bring the bar 11 into alignment with the guide 14. It is subsequently actuated by the pusher 15 which slides the bar 11 along the guide 14 to insert it in the spindle 12, with the machine at a standstill.

When the bar 11 has been made to move forwards with its end in the spindle 12, now suitably supported by the fixed guide 14, the movable guide 16 with the relative pusher is lowered and the second pusher 26 is inserted laterally in alignment at the rear of the fixed guide 14. The extractor 39 is then actuated which takes the bar 11, making it move backwards slightly to insert its end in the collet 27 of the second pusher. Then, after starting up the machine tool, the PLC drives the motor 38 to move the bar 11 forwards by steps in the spindle 12 in accordance with the work program of the machine tool.

From what has been said and shown it is therefore clear that a bar feeders have been provided whose construction is extremely simple and overall dimensions extremely small, thanks to the special arrangement and configuration of the means for guiding the bars and the pushers which operate in sequence to transfer and insert a bar in a spindle of a machine and to move it subsequently forwards by steps, while substantially reducing the operating time of the loader and of the machine tool.

What is claimed is:

1. A bar feeder for a machine tool having at least one spindle, the feeder comprising:

first bar guide means extending in a bar feeding direction axially aligned to a spindle of the machine, first and second bar pushing members slidably supported in said bar feeding direction, and first drive means to sequentially actuate said pushing members to forward a bar in an axially aligned condition with said first bar guide means; second bar guide means being furthermore provided in a position rearward to said first bar guide means; said second bar guide means conjunctly to an associated one of said pushing members, respectively the second one of said pushing members being reciprocable between a lateral retracted and an advanced position aligned to said first bar guide means, second drive means to laterally reciprocate said pushing member between said retracted and advanced positions and programmable control means (CPU) programmed to sequentially actuate said first and second drive means for said bar pushing members to firstly advance a bar along said first bar guiding means and into the spindle by the first one of the pushing members while maintaining an inoperative condition of the machine, and successively to step forward said bar into said spindle by the second one of said pushing members during a working cycle of the machine.

2. Feeder according to claim 1, in which the second pushing member comprises a freely rotating collet to retain the rear end of the bar, said first pushing member being driven and controlled by said programmable control means (PLC) to bring the rear end of the bar slightly beyond the abovementioned rotating collet, and in that bar grippers are provided to grip the bar and insert its rear end in said rotating collet of the aforementioned second pushing member.

3. Feeder according to previous claim 1, in which said second bar guiding means is in the form of a channel member.

4. Feeder according to claim 1, in which said second bar guiding means and the associated pushing member, respectively the second one of said pushing members, are disposed on opposite sides in respect to the axis defining the feeding direction of the first bar guiding means, and are separately reciprocable between a laterally retracted and an advanced position axially aligned with said first guiding means.

5. Feeder according to claim 1, in which said first and second bar guiding means and both said pushing members are conjunctly reciprocable between said laterally retracted and advanced positions.

6. Feeder according to claim 4, in which said second pushing member is supported by front and rear support sleeves, said sleeves being provided on respective carriages moving along a slideway and in that said second pushing member is slidingly supported by the front sleeve.

7. Bar feeder according to claim 1, comprising means for loading bars from a store to load them in the abovementioned second guide means, said bar loading means and said second bar guide means with the related pushing member and the respective drive means, being jointly movable in a vertical plane between a lowered position below said store, and a raised position in which said bar guide means and pushing member are aligned with the first bar guide means, and in that the loading means comprises a slanted surface extending in a corresponding lateral slanting surface of the abovementioned second guide means, and bar stop means being also provided which extends vertically on one side and between the lowered and the raised positions of said second bar guide means.

8. Feeder according to claim 7, in which the second pushing member is provided with a guide channel and drive means movably supported and pivotally reciprocable between said retracted and advanced positions.

9. Feeder according to claim 1, in particular for multi-spindle machine tools, comprising a plurality of bar feeding units tiltably supported by a rotating drum, each feeding unit comprising said bar pushing members and said bar guiding means, and in that additional drive means are provided, controlled by said programmable control unit (PLC) to reciprocate each feeding unit in a prefixed angular position during rotation of said drum.

* * * * *